US012110982B2

(12) United States Patent
Ratti (10) Patent No.: US 12,110,982 B2
(45) Date of Patent: Oct. 8, 2024

(54) FLUID SHUT-OFF DEVICE

(71) Applicant: RATTIINOX S.R.L., Mariano Comense (IT)

(72) Inventor: Walter Ratti, Mariano Comense (IT)

(73) Assignee: RATTIINOX S.R.L.

( * ) Notice: Subject to any disclaimer, the term of this patent is extended or adjusted under 35 U.S.C. 154(b) by 0 days.

(21) Appl. No.: 18/009,971

(22) PCT Filed: Jun. 15, 2021

(86) PCT No.: PCT/IB2021/055256
§ 371 (c)(1),
(2) Date: Dec. 12, 2022

(87) PCT Pub. No.: WO2021/255634
PCT Pub. Date: Dec. 23, 2021

(65) Prior Publication Data
US 2023/0228343 A1    Jul. 20, 2023

(30) Foreign Application Priority Data

Jun. 15, 2020  (IT) ....................... 102020000014203

(51) Int. Cl.
*F16K 31/122*  (2006.01)
*F16K 7/17*  (2006.01)
(Continued)

(52) U.S. Cl.
CPC ............ *F16K 31/1221* (2013.01); *F16K 7/17* (2013.01); *F16K 25/005* (2013.01);
(Continued)

(58) Field of Classification Search
CPC ...... F16K 31/1221; F16K 7/17; F16K 25/005; F16K 31/126; F16K 31/50;
(Continued)

(56) References Cited

U.S. PATENT DOCUMENTS 3,134,570 A    5/1964 Jarrett
4,051,865 A    10/1977 Cocking et al.
(Continued)

FOREIGN PATENT DOCUMENTS

EP    0072681 A1    2/1983
EP    0508658 A2    10/1992
(Continued)

OTHER PUBLICATIONS

European Patent Office, International Search Report issued in PCT/IB2021/055256, mailed Jul. 29, 2021, Rijswijk, NL.
(Continued)

*Primary Examiner* — Daphne M Barry
(74) *Attorney, Agent, or Firm* — Ferguson Case Orr Paterson (57) ABSTRACT

A fluid shut-off device has a valve body delimiting an inlet duct and an outlet duct and having an intermediate portion delimiting an intermediate chamber that provides fluid connection between the inlet and outlet ducts. The inlet duct has an inlet duct connection edge. The intermediate chamber has a sealing surface and accommodates a diaphragm having a diaphragm sealing portion that in a closing position of the inlet duct, cooperates, by a diaphragm support surface, with the sealing surface to occlude the inlet duct. The diaphragm has a diaphragm bending portion permanently connecting the diaphragm sealing portion to the valve body to exclusively operate under bending. The diaphragm sealing portion delimits a diaphragm seat. A control element has a control stem with predetermined transverse control stem dimension and integrally received in the diaphragm seat, which transmits movement to the diaphragm sealing portion at least between the closing position and an opening position of the inlet duct.

21 Claims, 6 Drawing Sheets

(51) Int. Cl.
*F16K 25/00* (2006.01)
*F16K 31/126* (2006.01)
*F16K 31/50* (2006.01)
*F16K 37/00* (2006.01)
*F16K 41/10* (2006.01)

(52) U.S. Cl.
CPC ............ *F16K 31/126* (2013.01); *F16K 31/50* (2013.01); *F16K 37/0008* (2013.01); *F16K 41/103* (2013.01)

(58) Field of Classification Search
CPC ............... F16K 37/0008; F16K 41/103; F16K 37/0066; F16K 31/143; F16K 31/163; F16K 31/165
See application file for complete search history.

(56) References Cited

U.S. PATENT DOCUMENTS

| | | | |
|---|---|---|---|
| 4,280,680 A * | 7/1981 | Payne | ....................... F16K 7/16 251/210 |
| 4,359,204 A | 11/1982 | Williams | |
| 5,377,956 A | 1/1995 | Müller | |
| 5,609,185 A | 3/1997 | Booth et al. | |
| 7,063,304 B2 * | 6/2006 | Leys | ......................... F16K 7/17 251/335.2 |
| 2001/0032958 A1 | 10/2001 | Artsvelyan | |
| 2002/0003222 A1 | 1/2002 | Fukano et al. | |
| 2006/0065868 A1 | 3/2006 | Strong | |
| 2008/0116412 A1 | 5/2008 | Masamura et al. | |
| 2009/0020722 A1 * | 1/2009 | Masamura | ............ F16K 31/122 251/331 |
| 2014/0158923 A1 | 6/2014 | Wolpert et al. | |

FOREIGN PATENT DOCUMENTS

| | | |
|---|---|---|
| FR | 1249282 A | 12/1960 |
| JP | H01188777 A | 7/1989 |
| SE | 445852 B | 7/1986 |

OTHER PUBLICATIONS

European Patent Office, International Written Report issued in PCT/IB2021/055256, mailed Jul. 29, 2021.

* cited by examiner

FIG. 6

FLUID SHUT-OFF DEVICE

CROSS-REFERENCE TO RELATED APPLICATIONS

This application is a National Phase Application of PCT International Application No. PCT/IB2021/055256, having an International Filing Date of Jun. 15, 2021 which claims the benefit of priority to Italian Patent Application No. 102020000014203, filed Jun. 15, 2020, each of which is hereby incorporated by reference in its entirety.

TECHNICAL FIELD OF THE INVENTION

The present invention relates, in general, to the field of fluid shut-off devices, and in particular it relates to a bending diaphragm valve of the type for applications called clean and aseptic. Aseptic manufacturing processes require equipment capable of meeting CIP and SIP requirements. Clean and aseptic valves must be compact, free of processed fluid stagnation areas, and must allow to minimize the use of cleaning solutions. For this reason, these valves are made of special stainless steel and PTFE diaphragms which exclusively operate under bending and compression in the sealing areas.

The valves used in chemical or food plants have a stainless steel body and valve elements or diaphragms made of PTFE (polytetrafluoroethylene).

PTFE, when stressed by cyclic compression, is subject to sliding (cold flow) if it is not obtained by compression. Therefore, the shutter bodies of these valves are made of pre-compressed polytetrafluoroethylene material, mechanically machined by chip removal so as to obtain the desired shape of the diaphragm.

BACKGROUND ART

Even when stabilized by virtue of these compression production processes, the known diaphragms of clean and aseptic valves (also called CAD: Clean & Aseptic Design) still undergo a reduction in volume, called "recompression", when subjected to high pressures varying over time, in particular cyclical ones, due to the frequent opening and closing of the valve.

In the case of CAD valves, the reduction in the volume of the diaphragm involves a variation in the stroke of the actuator which must open and close the diaphragm so as to always ensure the sealing support of the diaphragm against the valve body. In case of recompression of the diaphragm material, there is a frequent risk of reaching the limit of the stroke of the actuator which moves the diaphragm and therefore the failure to close the valve itself.

From documents U.S. Pat. No. 4,051,865A, SE445852B U.S. Pat. No. 5,609,185A and US2014158923A1, solutions of diaphragm valves which work under bending are known.

From document U.S. Pat. No. 5,377,956A, producing a diaphragm with a mushroom-shaped peduncle is known, gripped externally as undercut by a gripping element for the movement thereof.

This known solution, when subjected to repeated opening and closing cycles, leads to a sudden deterioration of the mushroom-shaped peduncle with the risk of breaking the diaphragm and failing to open the valve.

A similar solution is known from US2001032958A1.

Completely different solutions, when considering the operating logic, are known from U.S. Pat. No. 4,359,204A, EP0508658A2 and also FR1249282A, where a membrane and not a diaphragm is provided as the shutter element. Said membrane made of elastic material is folded over in a bellows manner to allow an extension thereof in the closed position.

These bellows folds show signs of structural failure very early, with cracks and the separation of particles or debris of membrane material, which is unacceptable in many chemical or food plants for which CAD valves are mainly intended.

These known membranes are unsuitable for applications in fields in which it is necessary to ensure, at the end of the process, the absence of product in the chambers of the shut-off device. In particular, it must be ensured that the product does not remain trapped, not even in minimal quantities, in the interstices, not only those which, due to some geometries of these membranes, are present between the membrane and the valve body, but also in the folds of the membrane itself. Without this requirement, the passage of a first fluid, even after emptying and cleaning, risks contaminating a second fluid, remaining trapped even in small quantities in the folds of the membrane. Therefore these known devices are unsuitable for processes in which a CAD valve is required.

From document U.S. Pat. No. 3,134,570A a membrane valve is known which works with an extension of the elastic material with which the membrane is made.

This solution also has all the limitations of the bellows membranes described above, and creates a stress on the structure of the stretched membrane which is set to have a very limited life, and is subjected to a number of opening and closing cycles unsuitable for many plants.

Other solutions are known from EP0072681, JP H01 188777, US 2006/065868, US 2002/003222, US 2008/116412. However, these known solutions have the strong drawback that the diaphragm is pressed during closing by the control member and is pulled during opening by the control member, showing two highly dangerous drawbacks. On the one hand, the diaphragm is pressed and changes the size thereof over time, modifying the correct device sealing closing position thereof.

On the other hand, the pulling and compression action exerted by the control member soon loosens the grip of the control member, creating a displacement, sometimes a clearance and sometimes a relative displacement, between the control member and the diaphragm, once again with the issue that the correct device sealing closing position changes over time.

Therefore, the need remains strongly felt to minimize the variability of the behavior of the diaphragm under cyclic compression, avoiding forms which accentuate diaphragm fatigue stress and, at the same time, a firm and lasting connection between the control stem and the diaphragm.

OBJECT AND SUMMARY OF THE INVENTION

It is therefore the object of the present invention to solve the drawbacks of the background art and to allow the above-mentioned requirements to be achieved, providing a fluid shut-off device capable of ensuring a seal over time with a reduced recompression of the diaphragm material.

This and other objects are achieved by a fluid shut-off device as described and claimed herein.

Some advantageous embodiments of the present invention are also described.

By virtue of the general embodiment and of the variants described above and further described below, it is possible to obtain the following advantages.

The part of the diaphragm portion which faces the gap or opening of the inlet duct is particularly small in size and allows to reduce the dimensional changes of the diaphragm caused by diaphragm material fatigue or by recompression.

By virtue of the suggested solutions it is possible to satisfy conflicting needs, i.e., to press the diaphragm and in particular the sealing portion thereof against the support surface or sealing surface of the intermediate chamber close to the edge of the inlet duct so as to ensure a perfect seal, and at the same time avoid the separation between the control stem and the diaphragm, as well as always have an accurate movement, avoiding excessive changes in volume or thickness of the diaphragm pressed against the valve body, dimensional changes of the diaphragm which would force a variable stroke of the control element over time, which is to be avoided.

The solutions suggested allow to drastically increase the volume of the control stem and to reduce the volume of the body of the diaphragm.

From tests carried out with cycles of 4 seconds, repeated for 24 hours over several days, the diaphragms according to the present invention have shown a minimum deformation, shortening by only 0.3 mm, and, above all, a deformation which stabilized rapidly. Therefore the claimed solution has shown a reduced recompression of the diaphragm made of PTFE.

Advantageously, the ratio between the volume of the control element made of stainless steel and the diaphragm made of PTFE, according to the embodiments, allows to reach a prolonged life even under severe conditions.

BRIEF DESCRIPTION OF THE DRAWINGS

Further features and advantages of the invention will become apparent from the following description of preferred embodiments thereof, given by way of non-limiting example, with reference to the accompanying drawings, in which.

DETAILED DESCRIPTION

Figure 1:
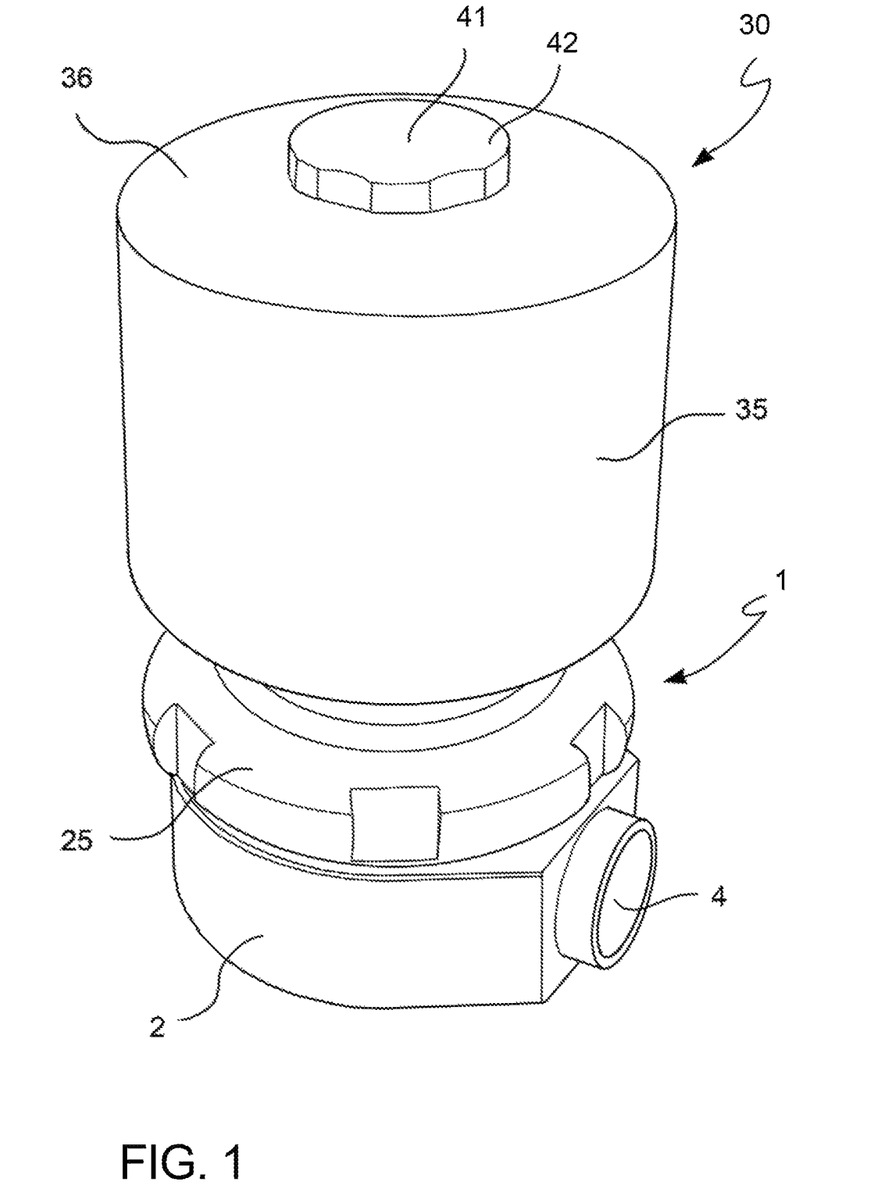
FIG. 1 diagrammatically shows in an axonometric view a fluid shut-off device according to the invention and connected to a pneumatic actuator.
Figure 2:
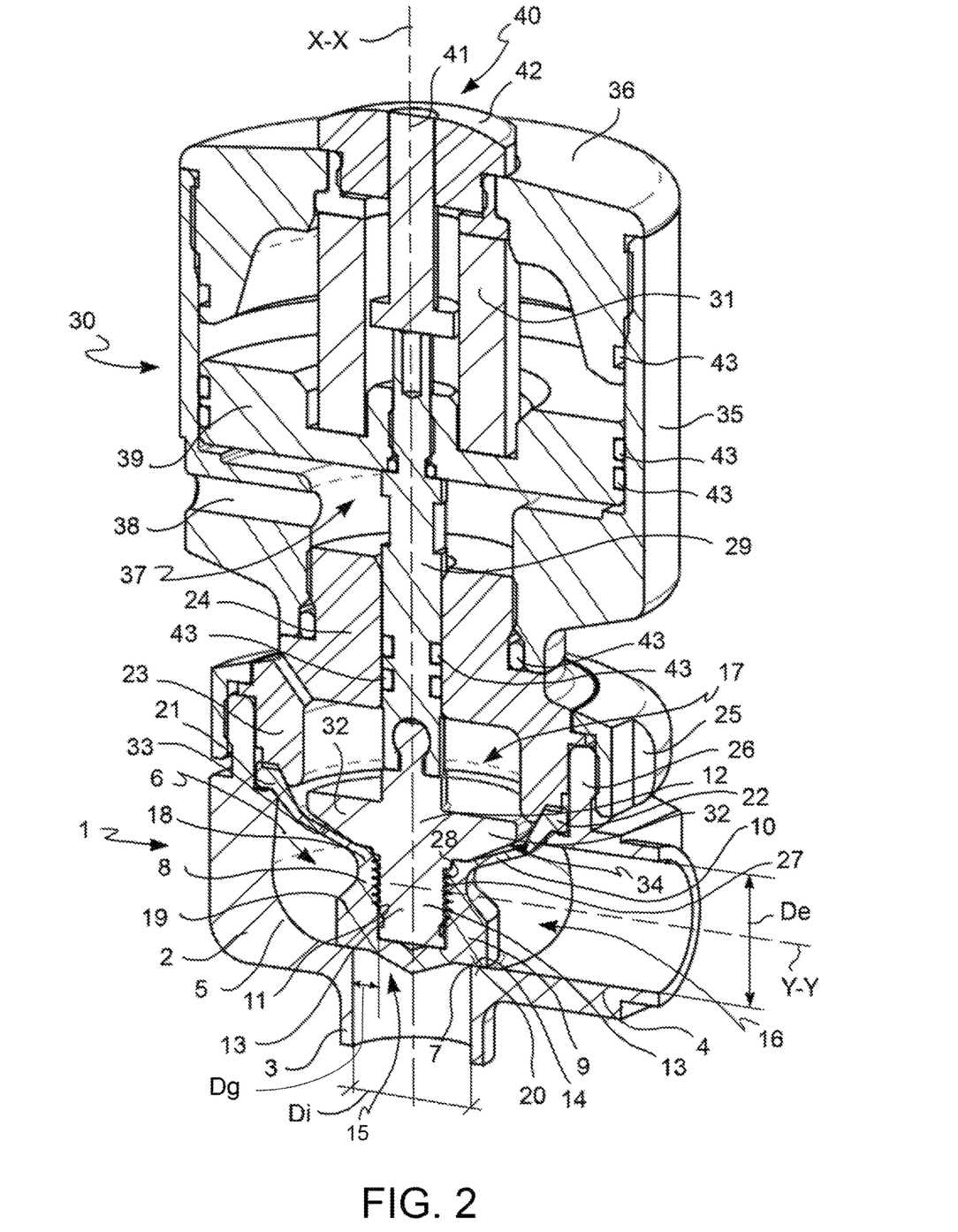
FIG. 2 diagrammatically shows in an axonometric sectioned view, in a median plane or a plane passing along the predetermined diaphragm movement direction for opening and closing the inlet duct, the device and actuator in FIG. 1.
Figure 3:
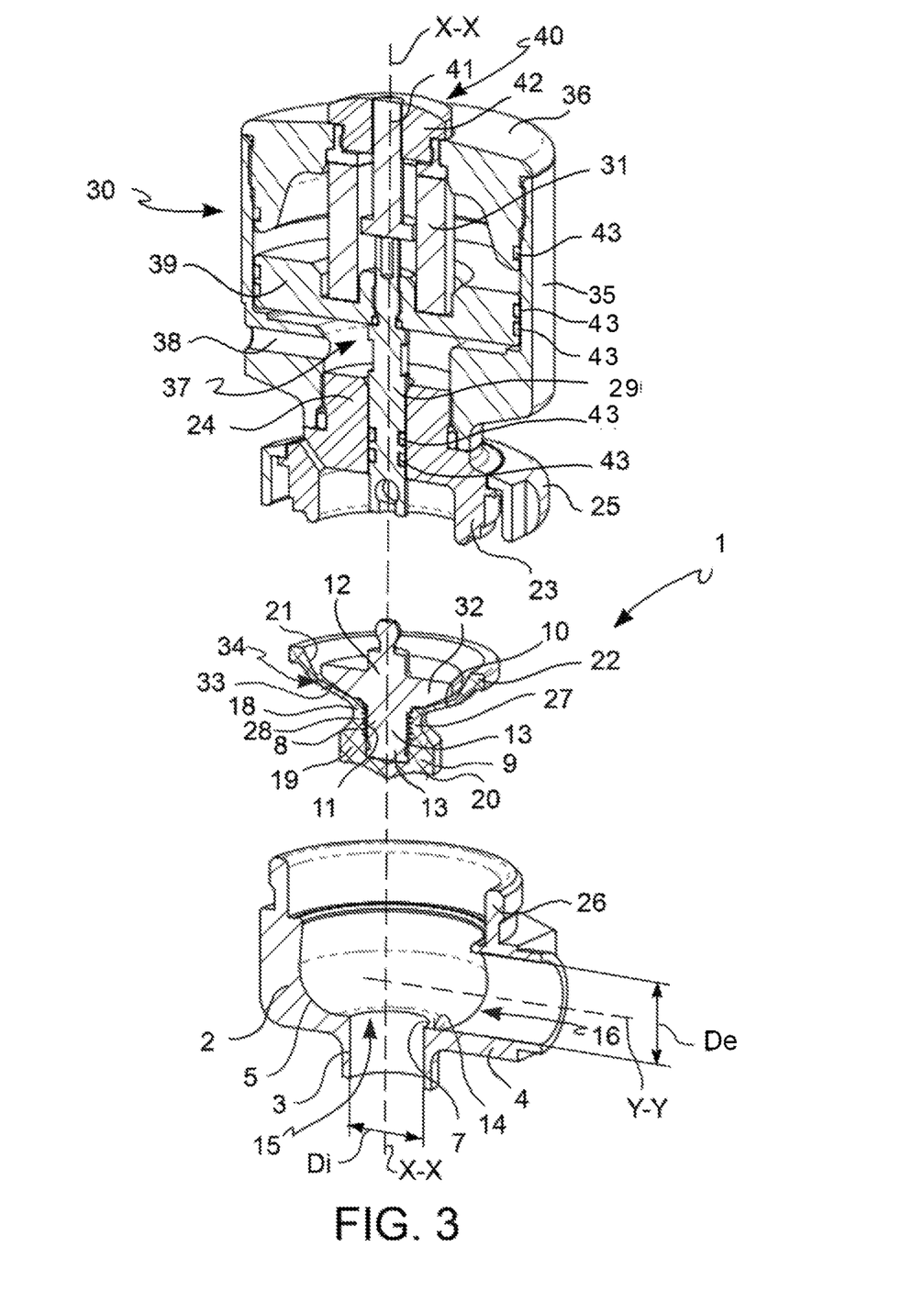
FIG. 3 diagrammatically shows, in an axonometric sectioned view with separate parts, the device and actuator in FIG. 1.
Figure 4:
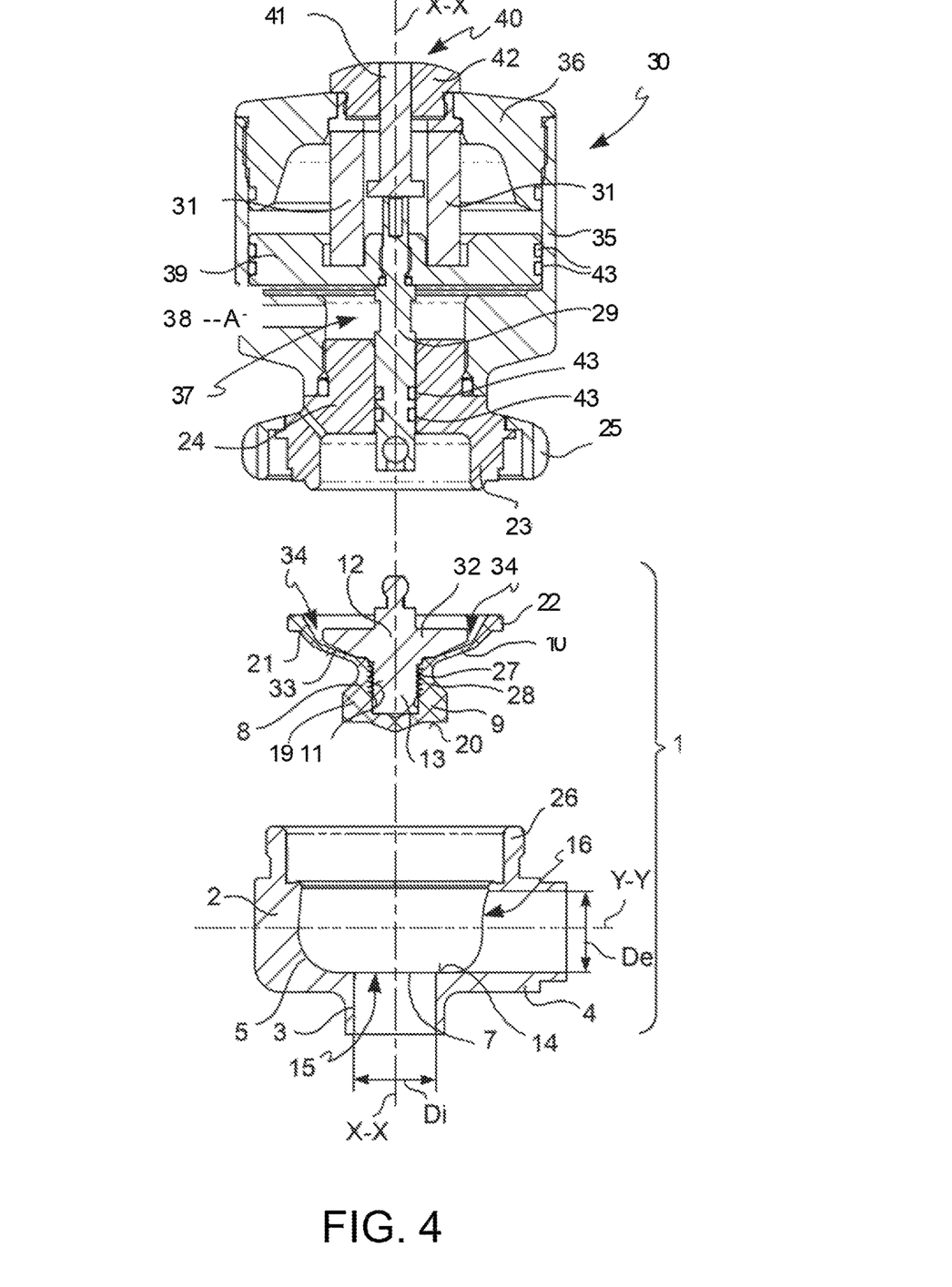
FIG. 4 shows in section a median plane or a plane passing along the predetermined diaphragm movement direction for opening and closing the inlet duct, the device and actuator in FIG. 1.
Figure 5:
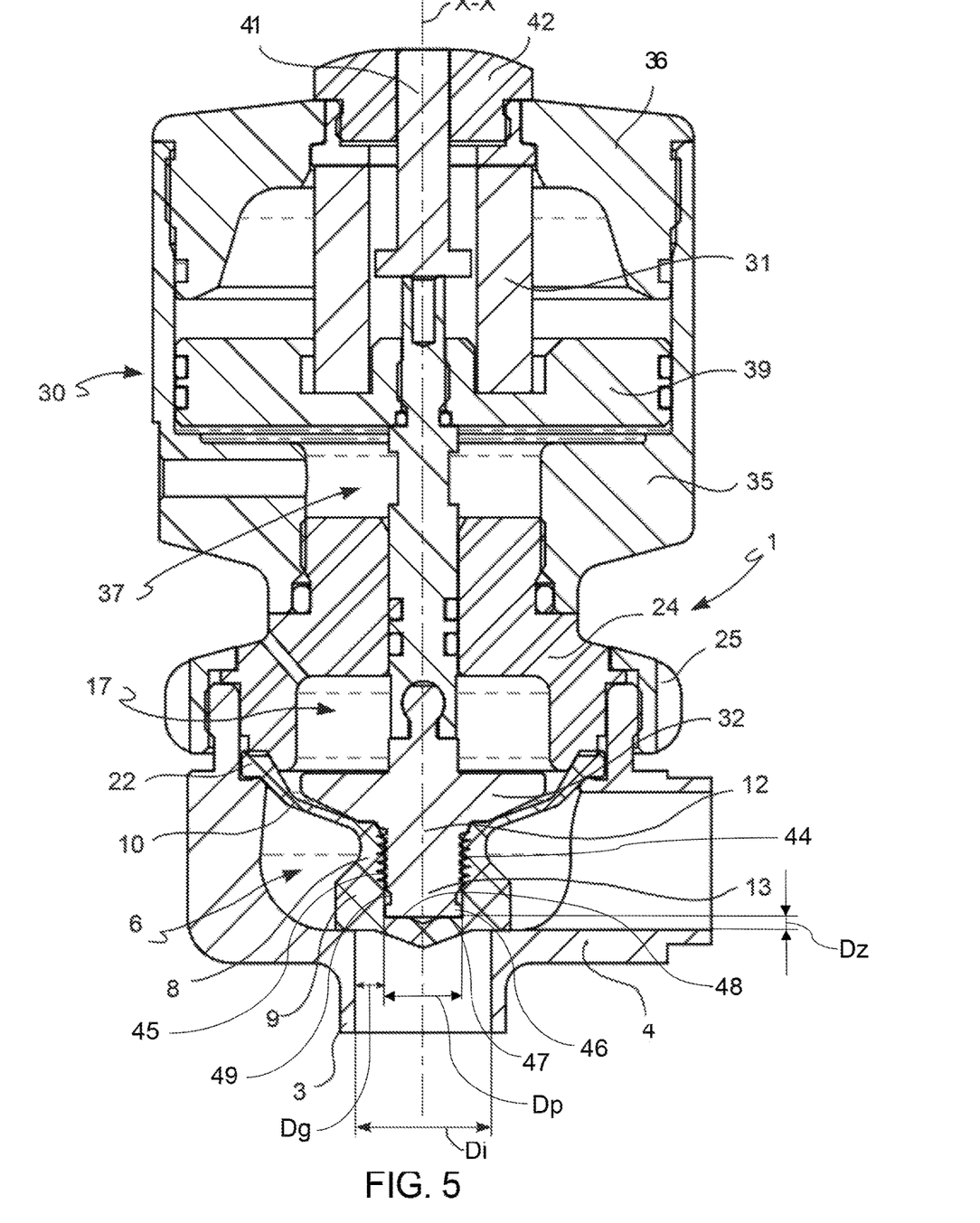
FIG. 5 and FIG. 6 show in section, in a median plane or a plane passing along the predetermined diaphragm movement direction for opening and closing the inlet duct, the device and actuator in FIG. 1 in the closed and respectively open position.
Figure 6:
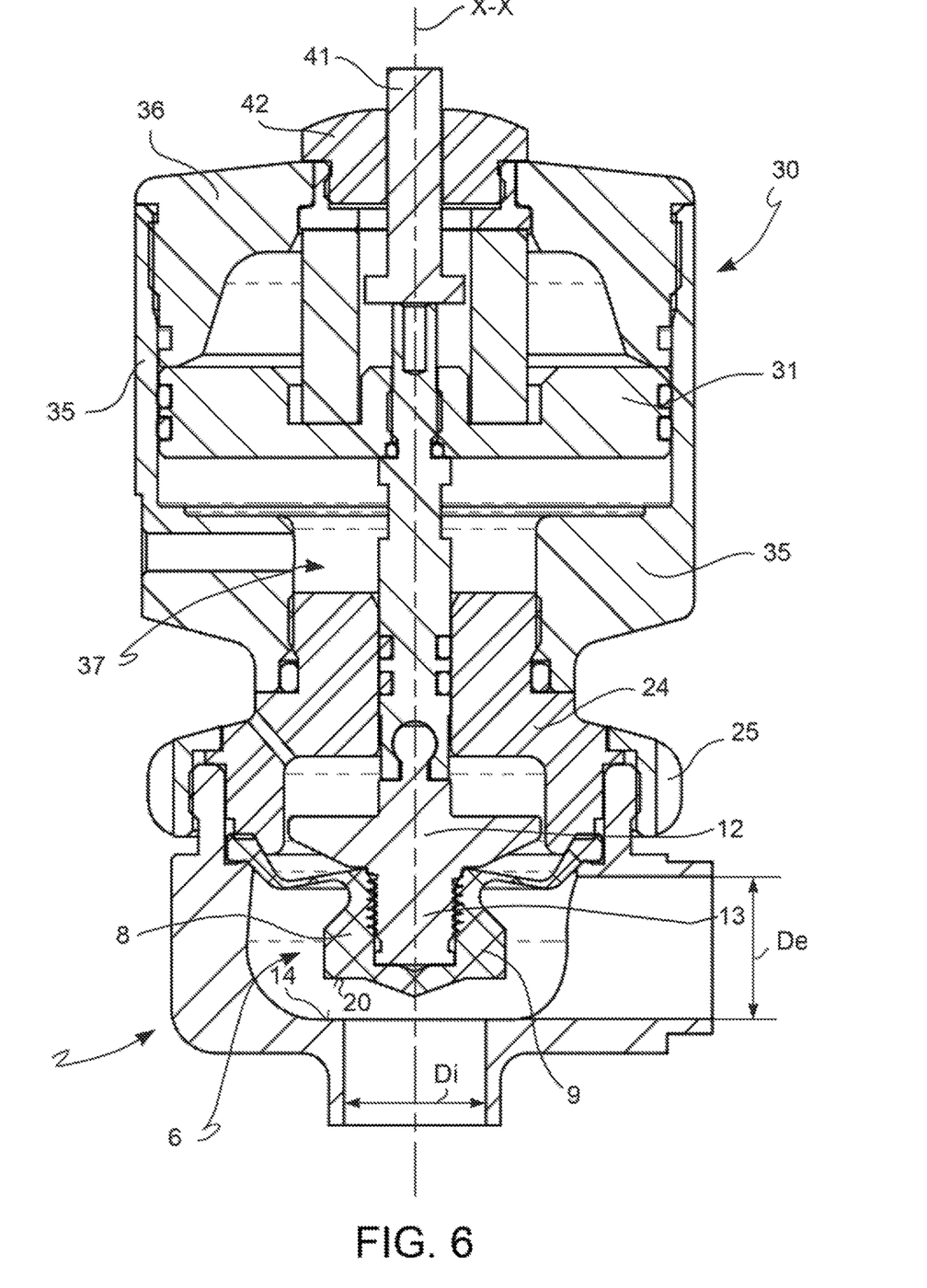

The present invention will now be described in detail with reference to the accompanying drawings to allow those skilled in the art to practice and use it. Various changes to the embodiments described will be readily apparent to those skilled in the art and the general principles described may be applied to other embodiments and applications without departing from the scope of protection of the present invention, as defined in the appended claims. Therefore, the present invention should not be considered as limited to the embodiments described and shown, but should be granted the broadest scope of protection in compliance with the features described and claimed.

Unless otherwise defined, all the technical and scientific terms used herein have the same meaning commonly used by those of ordinary skill in the field of the present invention. In case of a conflict, the present description, including the definitions provided, will be binding. Furthermore, the examples are merely provided for illustrative purposes, and as such should not be considered as limiting.

In order to facilitate the understanding of the embodiments described herein, reference will be made to some specific embodiments and a specific language will be used to describe them. The terminology used in this document has the purpose of describing only particular embodiments, and is not intended to limit the scope of the present invention.

In accordance with a general embodiment, a fluid shut-off device 1 comprises a valve body 2.

Said valve body 2 at least partially delimits an inlet duct 3 and an outlet duct 4.

Said inlet duct 3 has a predetermined transverse inlet duct dimension Di.

In accordance with an embodiment, said transverse inlet duct dimension Di is the diameter of the inlet duct 3 with a tubular shape. In accordance with an embodiment, said outlet duct 4 has a predetermined transverse outlet duct dimension De. In accordance with an embodiment, said transverse outlet duct dimension De is the diameter of the outlet duct 4 with a tubular shape.

The valve body 2 comprises an intermediate portion 5. The intermediate portion 5 at least partially delimits an intermediate chamber 6; the intermediate chamber 6 provides a fluid connection between the inlet duct 3 and the outlet duct 4.

Said inlet duct 3 comprises an inlet duct connection edge 7 formed by the intersection between said intermediate portion 5 and said inlet duct 3.

In accordance with an embodiment, said outlet duct 4 comprises an outlet duct connection edge 4 formed by the intersection between said intermediate portion 5 and said outlet duct 4.

Said intermediate chamber 6 comprises a sealing surface 14.

In accordance with an embodiment, said sealing surface 14 is arranged about said inlet duct connection edge 7.

Said intermediate chamber 6 accommodates a diaphragm 8.

Said diaphragm 8 has a body in a single piece.

Said diaphragm 8 comprises a diaphragm sealing portion 9; said diaphragm sealing portion 9, in the closing position of the inlet duct 3, cooperates, by means of a diaphragm support surface 20, with said sealing surface 14 to occlude said inlet duct 3.

Said diaphragm 8 comprises a diaphragm bending portion 10; said diaphragm bending portion 10 permanently connects the diaphragm sealing portion 9 to the valve body 2 so as to exclusively operate under bending.

Said diaphragm sealing portion 9 delimits a diaphragm seat 11.

Said fluid shut-off device 1 further comprises a control element 12.

Said control element 12 comprises a control stem 13 comprising a predetermined transverse control stem dimension Dp.

Said control stem 13 is integrally received in said diaphragm seat 11.

Said control stem 13 transmits a movement to said diaphragm sealing portion 9 at least between said closing position of the inlet duct 3 and an opening position of the inlet duct 3, moving along a predetermined diaphragm movement direction X-X.

Everywhere in the text the cooperation between inlet duct and diaphragm is mentioned, it must be alternatively understood as cooperation between outlet duct and diaphragm. In fact, in some applications, the diaphragm occludes the inlet duct and in others it occludes the outlet duct. Advantageously, said sealing surface 14 is a flat sealing surface placed orthogonally to said predetermined diaphragm movement direction X-X. For example, but not necessarily, said sealing surface 14 is an annular flat surface. For example, but not necessarily, said sealing surface 14 is a surface surrounding said inlet duct connection edge 7 or said outlet duct connection edge.

Said diaphragm support surface 20 is a flat support surface placed orthogonally to said predetermined diaphragm movement direction X-X, or if it must cooperate with said outlet duct connection edge, orthogonally to a predetermined diaphragm outlet movement direction Y-Y directed longitudinally to said outlet duct 4. For example, but not necessarily, said diaphragm support surface 20 is an annular flat surface.

The transverse control stem dimension Dp is between a value greater than the transverse inlet duct dimension Di and a dimension which leaves a distance Dg, measured on a plane orthogonal to the predetermined diaphragm movement direction X-X, between the control stem 13 and the inlet duct connection edge 7, lower than 25% of the transverse inlet duct dimension Di.

Advantageously, said control stem 13 comprises a self-tapping stem thread 27 which screws on by entering into the body of said diaphragm 8 thus creating a diaphragm thread 28 in the diaphragm seat 11, thus creating a close coupling between the profile of said self-tapping stem thread 27 and said body of the diaphragm 8. By virtue of the provision of a self-tapping thread, the control stem penetrates deforming the wall of the diaphragm 8 which delimits the diaphragm seat 11, deforming the material of said diaphragm 8 which enters between the crests of the thread 44 and creates a firm connection between the control stem and the diaphragm 8, a firm connection which allows many or very numerous opening and closing cycles of the diaphragm 8 without thereby showing the slightest movement between the diaphragm and the stem.

The combination of the features of the transverse control stem dimension Dp and inlet duct dimension Di and the close coupling created by the self-tapping stem thread 27 in the body of the diaphragm 8 creates a solution capable of reduced or very reduced deformations or dimensional changes of the diaphragm 8 also over time, ensuring, over time, the correct operation of the device, always ensuring a perfect seal over time with an optimal and precise positioning of the diaphragm 8 which faithfully and precisely follows the movement of the control stem 13.

In accordance with an embodiment, said self-tapping stem thread 27 is a thread of the cortical type which deforms the body of the diaphragm 8 by screwing into the wall of said diaphragm seat 11, so as to penetrate into the body of the diaphragm 8 with a resistant section of the body of the diaphragm 8 which is subjected to the thrust in closing and pulling during the opening of the diaphragm 8.

In accordance with an embodiment, said self-tapping stem thread 27 comprises tapered and pointed thread crests 44 of the control stem 13 with a predetermined thread height, which leave a helical thread channel 45 therebetween of a size similar to said thread height, capable of receiving the material of the body of the diaphragm 8 deformed by said thread crests 44 so as to completely fill said helical thread channel 45.

In accordance with an embodiment, said self-tapping stem thread 27 comprises tapered and pointed thread crests 44 of the control stem 13 with a predetermined thread height varying from ½ to ¼ of the thickness of the body of the diaphragm 8 in the narrower section thereof which forms said diaphragm seat 11, so as to penetrate for a depth varying between ½ and ¼ into the body of the diaphragm 8 creating a resistant section of the body of the diaphragm 8 which interacts with said thread crests 44 and resists repeated cycles when subjected to thrust during the closing and to pulling during the opening of the diaphragm 8.

In accordance with an embodiment, said self-tapping stem thread 27 comprises tapered and pointed thread crests 44 of the control stem 13 with a predetermined thread height equal to ⅓ of the thickness of the body of the diaphragm 8 in the narrower section thereof which forms said diaphragm seat 11, so as to penetrate for a depth equal to ⅓ into the body of the diaphragm 8 creating a resistant section of the body of the diaphragm 8 which interacts with said thread crests 44 and resists repeated cycles when subjected to thrust during the closing and to pulling during the opening of the diaphragm 8.

In accordance with an embodiment, said control stem 13 comprises a stem head 46 placed at the end of said control stem 13.

In accordance with an embodiment, said stem head 46 comprises a flat stem end surface 47 orthogonal to said predetermined diaphragm movement direction X-X which abuts against the seat bottom 48 of said diaphragm seat 11, integrating said control stem 13 with said diaphragm 8.

In accordance with an embodiment, said stem head 46 is separated from said self-tapping stem thread 27 by means of a discharge groove 49 which, when said control stem 13 is inserted with the self-tapping stem thread 27 thereof into the wall which delimits said diaphragm seat 11, deforming the material of said diaphragm 8, said deformed material enters said discharge groove 49 preventing the unscrewing of said control stem from the coupling position thereof to said diaphragm 8. By virtue of the provision of this discharge groove 49 it is ensured that the material of the body of the diaphragm 8, when deformed by the forced screwing of the cortical thread, deforms and enters said discharge groove 49, creating an undercut stop which locks the control stem 13 in the perfect operating position thereof, which ensures very numerous operating opening and closing cycles, avoiding losing the relative position between the control stem 13 and the diaphragm 8 and between the diaphragm 8 and the intermediate chamber sealing surface 14, creating a perfect seal of the device over time.

In accordance with an embodiment, said transverse control stem dimension Dp leaves a distance, measured on a plane orthogonal to said predetermined diaphragm movement direction X-X, between said control stem 13 and said inlet duct connection edge 7, lower than 22% of the transverse inlet duct dimension Di.

In accordance with an embodiment, said fluid shut-off device 1 is a Clean & Aseptic Design or CAD device, i.e., a device 1 for applications in which contamination between successive fluids processed by the device is not allowed and a complete cleaning of the intermediate chamber 6 must be possible without necessarily disassembling the device itself.

In accordance with an embodiment, and as already described above, in any of the embodiments described it is possible to replace "inlet duct" with "outlet duct" and to replace "outlet duct" with "inlet duct".

Therefore, in accordance with an embodiment, said transverse control stem dimension Dp is between a value greater than said transverse outlet duct dimension De and a dimension which leaves a distance, measured on a plane orthogonal to said predetermined diaphragm movement direction Y-Y, between said control stem 13 and said outlet duct connection edge, lower than 25% of the transverse outlet duct dimension De.

In accordance with an embodiment, said transverse control stem dimension Dp leaves a distance, measured on a plane orthogonal to said predetermined diaphragm movement direction Y-Y, between said control stem 13 and said outlet duct connection edge, lower than 22% of the transverse inlet duct dimension Di.

In accordance with an embodiment, in said closing position of the outlet duct 4 of the sealing diaphragm 9 the distance, measured parallel to said predetermined diaphragm movement direction Y-Y, between said control stem 13 and said outlet duct connection edge, is between 7% and 15% of the transverse outlet duct dimension De.

As it may be seen from the embodiments shown in the Figures and in accordance with an embodiment, said device 1 comprises a valve body 2, a sliding body 24 fitted into one end of said valve body 2 and fastened thereon with a threaded tightening ring nut 25.

Connected to said sliding body 24, a pneumatic actuator cylinder 35 is provided, closed at the top by a pneumatic actuator top 36 with which it forms a pressure chamber 37.

A pressurized fluid supply duct 38 for movement of a piston is present in the pneumatic actuator cylinder 35 to supply pressurized fluid to the pressure chamber 37.

Accommodated in said pressure chamber 37, a pneumatic actuator piston 39 is provided, to which a control shaft 29 is connected.

In accordance with an embodiment, said device 1 further comprises an open valve indicator 40.

Said open valve indicator 40 comprises an indicator stem 41 resting on said control shaft 29 or said pneumatic actuator piston 39 and received free to come out of said pneumatic actuator top 36 through a cap 42.

An elastic element or spring 31 constantly biases said pneumatic actuator piston 39 in the valve closing position, i.e., in the closing position of said diaphragm 8.

Seals 43 are provided in the moving members to allow a fluid seal of said pressure chamber 37.

Said control element 12 is connected, for example, idle in rotation but constrained in translation, to said control shaft 29.

As mentioned above, the sliding body 24 is fitted into one end of said valve body 2 with a connection flange 23 thereof and accommodates said control element 12 with the control stem 13 thereof fastened to said diaphragm 8.

In the examples shown in the Figures, the diaphragm 8 is axisymmetric in shape and is in a single piece.

The diaphragm 8 comprises a diaphragm connecting portion 21 having an annular diaphragm attachment body 22 constrained, pack-tightened, between said connection flange 23 and said valve body 2.

The diaphragm 8 further comprises a diaphragm bending portion 10 and a diaphragm sealing portion 9.

The diaphragm bending portion 10 connects said diaphragm sealing portion 9 to said diaphragm connecting portion 21 and deforms under bending to allow said diaphragm sealing portion 9 to pass from a closing position of the outlet gap of said inlet duct 3 in said intermediate chamber 6 to an opening position of said outlet gap.

In accordance with an embodiment, the diaphragm bending portion 10 has a flat or slightly concave or conical shape, preventing it from folding back on itself when the diaphragm is in the closed position.

In accordance with an embodiment, the valve body 2 comprises an annular and flat intermediate chamber sealing surface 14 adapted to receive, as support and sealing, said diaphragm sealing portion 9 occluding the outlet gap of the inlet duct 3.

In accordance with an embodiment, in said closing position of the inlet duct 3 of the sealing diaphragm 9 the distance, measured parallel to said predetermined diaphragm movement direction X-X, between said control stem 13 and said inlet duct connection edge 7, is between 7% and 15% of the transverse inlet duct dimension Di.

In accordance with an embodiment, said diaphragm 8 comprises a diaphragm sealing portion 9; said diaphragm sealing portion 9 cooperates with a sealing surface to occlude said outlet duct 4.

In accordance with an embodiment, said control stem 13 transmits a movement to said diaphragm sealing portion 9 at least between said closing position of the outlet duct 3 and an opening position of the outlet duct 4, moving along a predetermined diaphragm movement direction Y-Y.

In accordance with an embodiment, at least one diaphragm portion 8 surrounds one end of said control stem 13.

In accordance with an embodiment, said diaphragm 8 separates said control element 12 from the intermediate chamber 6.

In accordance with an embodiment, said intermediate chamber 6 is delimited by said intermediate portion 5 of said valve body 2 and by said diaphragm 8, as well as by gaps or openings 15, 16 for accessing the inlet duct 3 and the outlet duct 4.

In accordance with an embodiment, said diaphragm 8 separates said intermediate chamber 6 from a control element sliding chamber 17; said control element sliding chamber 17 receives and guides said control element 12 in the movement thereof between said closing position of the inlet duct 3 to an opening position of the inlet duct 3.

In accordance with an embodiment, said diaphragm 8 is axisymmetric in shape.

In accordance with an embodiment, said diaphragm sealing portion 9 is cup-shaped.

In accordance with an embodiment, said diaphragm sealing portion 9 comprises a diaphragm stem 18 and an enlarged diaphragm base 19.

In accordance with an embodiment, said enlarged diaphragm base 19 comprises a diaphragm support surface 20 which sealingly cooperates with said sealing surface 14 of the intermediate chamber 6.

In accordance with an embodiment, said diaphragm bending portion 10 is inverted dome-shaped.

In accordance with an embodiment, said diaphragm bending portion 10 connects to said valve body by means of a diaphragm connecting portion 21.

In accordance with an embodiment, said diaphragm connecting portion 21 comprises an annular diaphragm attachment body 22 adapted to pack-tighten the diaphragm 8 between said valve body 2 and a connection flange 23 of a sliding body 24.

In accordance with an embodiment, said sliding body 24 delimits a control element sliding chamber 17 adapted to receive and guide said control element 12.

In accordance with an embodiment, said sliding body 24 is connected to said valve body 2 by means of a threaded ring nut 25 screwed onto an externally threaded portion 26 of said valve body 2.

In accordance with an embodiment, said diaphragm 8 is made of polytetrafluoroethylene, called PTFE.

According to an embodiment, said valve body 2 is made of stainless steel or of another alloy having good corrosion resistance.

In accordance with an embodiment, said control element 12 is made of stainless steel.

In accordance with an embodiment, said control stem 13 comprises a self-tapping stem thread 27 which screws on by entering into the body of said diaphragm 8 thus creating a diaphragm thread 28 in the diaphragm seat 11, thus creating a close coupling between the profile of said self-tapping stem thread 27 and said body of the diaphragm 8.

In accordance with an embodiment, the coupling between said control stem 13 and the body of said diaphragm 8 is so close that an attempt to unscrew the parts would involve breaking the diaphragm 8.

In accordance with an embodiment, said control element 12 is made of stainless steel and the control stem 13 thereof has a thread of a cortical type which deforms the body made of PTFE of the diaphragm 8 by screwing. The crests of the thread of the control stem 13 are very tapered and pointed, and the channel of the helicoid of the thread is very wide. The height of the thread is very prominent, to increase the resistant section in the body made of PTFE of the diaphragm 8 which will be subjected to thrust during the closing and to traction during the opening.

In accordance with an embodiment, said control element 12 is connected to a control shaft 29 of an actuator 30.

In accordance with an embodiment, said control element 12 is connected to a control shaft 29 of a pneumatic actuator 30.

In accordance with an embodiment, said control element 12 is constantly biased to said closing position of the inlet duct 3 by a spring 31.

In accordance with an embodiment, said control element 12 is an element in a single piece.

In accordance with an embodiment, said control element 12 is received in said diaphragm seat 11.

In accordance with an embodiment, said control element 12 comprises a control element plate 32.

In accordance with an embodiment, said control element plate 32 is in a single piece with said control stem 13.

In accordance with an embodiment, said control element 12 comprises a control element plate 32.

In accordance with an embodiment, the control element plate 32 comprises a diaphragm support surface 33 facing said diaphragm bending portion 10.

In accordance with an embodiment, said control element 12 comprises a control element plate 32.

In accordance with an embodiment, said control element plate 32 comprises a diaphragm support surface 33 and said diaphragm support surface 33 is conical or in the shape of a spherical sector.

In accordance with an embodiment, said control element 12 comprises a control element plate 32.

In accordance with an embodiment, said control element plate 32 comprises a diaphragm support surface 33.

In accordance with an embodiment, in said position of the diaphragm 8 for closing the inlet duct 3 and in a condition in which the diaphragm 8 is not worn or aged, a diaphragm clearance 34 exists between said diaphragm support surface 33 and said diaphragm bending portion 10; and in which said diaphragm clearance 34 increases by moving from said diaphragm sealing portion 9 to a diaphragm connecting portion 21 for the connection of said diaphragm 8 to the valve body 2.

Those skilled in the art may make many changes and adaptations to the embodiments described above or may replace elements with others, which are functionally equivalent, in order to meet contingent needs without however departing from the scope of the appended claims.

REFERENCE SIGNS 1 fluid shut-off device
2 valve body
3 inlet duct
4 outlet duct
5 intermediate portion
6 intermediate chamber
7 inlet duct connection edge
8 diaphragm
9 diaphragm sealing portion
10 diaphragm bending portion
11 diaphragm seat
12 control element
13 control stem
14 intermediate chamber sealing surface
15 gap or opening for accessing the inlet duct
16 gap or opening for accessing the outlet duct
17 control element sliding chamber
18 diaphragm stem
19 enlarged diaphragm base
20 diaphragm support surface
21 diaphragm connecting portion
22 annular diaphragm attachment body
23 connection flange
24 sliding body
25 threaded ring nut
26 valve body threaded portion
27 self-tapping stem thread
28 diaphragm thread
29 control shaft
30 actuator
31 spring
32 control element plate
33 diaphragm support surface
34 diaphragm clearance
35 pneumatic actuator cylinder
36 pneumatic actuator top
37 pressure chamber
38 pressurized fluid supply duct
39 pneumatic actuator piston
40 open valve indicator
41 indicator stem
42 cap
43 seals
44 thread crests
45 helical thread channel
46 stem head
47 stem end surface
48 seat bottom
49 discharge groove
Di transverse inlet duct dimension
De transverse outlet duct dimension
Dp transverse control stem dimension Dg distance between control stem and sealing surface transverse to X-X Dz distance, measured parallel to said predetermined diaphragm movement direction X-X, between said control stem and said inlet duct connection edge X-X predetermined diaphragm movement direction for opening and closing the inlet duct Y-Y predetermined diaphragm movement direction for opening and closing the outlet duct

The invention claimed is:

1. A fluid shut-off device comprising:
a valve body;
said valve body at least partially delimiting an inlet duct and an outlet duct, said inlet duct having a predetermined transverse inlet duct dimension;
said valve body comprising an intermediate portion, said intermediate portion at least partially delimiting an intermediate chamber, said intermediate chamber providing a fluid connection between the inlet duct and the outlet duct;
wherein
said inlet duct comprises an inlet duct connection edge formed by an intersection between the intermediate portion and the inlet duct;
said intermediate chamber comprises a sealing surface;
said intermediate chamber accommodates a diaphragm;
said diaphragm has a body in a single piece;
said diaphragm comprises a diaphragm sealing portion, and said diaphragm sealing portion, in a closing position of the inlet duct, cooperates, by a diaphragm support surface, with the sealing surface to occlude the inlet duct;
said diaphragm comprises a diaphragm bending portion, and said diaphragm bending portion permanently connects the diaphragm sealing portion to the valve body so as to operate exclusively under bending;
said diaphragm sealing portion delimits a diaphragm seat;
said fluid shut-off device further comprises a control element;
said control element comprises a control stem having a predetermined transverse control stem dimension;
said control stem is integrally received in the diaphragm seat;
said control stem transmits a movement to the diaphragm sealing portion at least between the closing position of the inlet duct and an opening position of the inlet duct, moving along a predetermined diaphragm movement direction;
wherein
said sealing surface is a flat sealing surface placed orthogonally to the predetermined diaphragm movement direction;
said diaphragm support surface is a flat support surface placed orthogonally to the predetermined diaphragm movement direction;
said predetermined transverse control stem dimension is between a value greater than the predetermined transverse inlet duct dimension and a dimension that leaves a distance, measured on a plane orthogonal to the predetermined diaphragm movement direction, between the control stem and the inlet duct connection edge, lower than 25% of the predetermined transverse inlet duct dimension; and
wherein
said control stem comprises a self-tapping stem thread that screws on by entering into the body of the diaphragm creating a diaphragm thread in the diaphragm seat, thus creating a close coupling between a profile of the self-tapping stem thread and the body of the diaphragm,
said self-tapping stem thread is a thread of a cortical type that deforms the body of the diaphragm by screwing into a wall of the diaphragm seat, so as to penetrate into the body of the diaphragm with a resistant section of the body of the diaphragm that is subjected to thrust during closing and to pulling during opening of the diaphragm, and
said inlet duct and said outlet duct intersect one another at an angle.

2. The fluid shut-off device of claim 1, wherein
said self-tapping stem thread comprises tapered and pointed thread crests of the control stem with a predetermined thread height, which leave a helical thread channel therebetween of a size similar to the predetermined thread height, capable of receiving a material of the body of the diaphragm deformed by the tapered and pointed thread crests so as to completely fill the helical thread channel; and/or wherein
said self-tapping stem thread comprises tapered and pointed thread crests of the control stem with a predetermined thread height varying from ½ to ¼ of a thickness of the body of the diaphragm in a narrower section thereof that forms the diaphragm seat, so as to penetrate for a depth varying between ½ and ¼ into the body of the diaphragm creating a resistant section of the body of the diaphragm that interacts with the tapered and pointed thread crests and resists repeated cycles when subjected to thrust during closing and to pulling during opening of the diaphragm; or wherein
said self-tapping stem thread comprises tapered and pointed thread crests of the control stem with a predetermined thread height equal to ⅓ of the thickness of the body of the diaphragm in the narrower section thereof that forms the diaphragm seat, so as to penetrate for a depth equal to ⅓ into the body of the diaphragm creating a resistant section of the body of the diaphragm that interacts with the tapered and pointed thread crests and resists repeated cycles when subjected to thrust in closing and pulling during opening of the diaphragm;
said predetermined transverse control stem dimension leaves a distance, measured on a plane orthogonal to the predetermined diaphragm movement direction, between the control stem and the inlet duct connection edge, lower than 22% of the predetermined transverse inlet duct dimension.

3. The fluid shut-off device of claim 1, wherein in the closing position of the inlet duct a distance, measured parallel to the predetermined diaphragm movement direction, between the control stem and the inlet duct connection edge, is between 7% and 15% of the predetermined transverse inlet duct dimension.

4. The fluid shut-off device of claim 1, wherein at least one diaphragm portion surrounds one end of the control stem.

5. The fluid shut-off device of claim 1, wherein said diaphragm separates the control element from the intermediate chamber.

6. The fluid shut-off device of claim 1, wherein said intermediate chamber is delimited by the intermediate portion of the valve body, by the diaphragm, and by gaps or openings for accessing the inlet duct and the outlet duct.

7. The fluid shut-off device of claim 1, wherein said diaphragm separates the intermediate chamber from a control element sliding chamber, and wherein the control element sliding chamber receives and guides the control element in a movement thereof between the closing position of the inlet duct and the opening position of the inlet duct.

8. The fluid shut-off device of claim 1, wherein said diaphragm is axisymmetric in shape.

9. The fluid shut-off device of claim 1, wherein said diaphragm sealing portion is cup-shaped.

10. The fluid shut-off device of claim 1, wherein said diaphragm sealing portion comprises a diaphragm stem and an enlarged diaphragm base, and wherein the enlarged diaphragm base comprises the diaphragm support surface which sealingly cooperates with the sealing surface of the intermediate chamber.

11. The fluid shut-off device of claim 1, wherein said diaphragm bending portion is inverted dome-shaped.

12. The fluid shut-off device of claim 1, wherein said diaphragm bending portion connects to the valve body by a diaphragm connecting portion.

13. The fluid shut-off device of claim 1, wherein said diaphragm is made of polytetrafluoroethylene (PTFE), obtained by mechanical machining of billets or bars produced under compression.

14. The fluid shut-off device of claim 1, wherein
said control stem comprises a stem head placed at the end of the control stem; and wherein
the stem head comprises a flat stem end surface orthogonal to the predetermined diaphragm movement direction which abuts against a seat bottom of the diaphragm seat, integrating the control stem with the diaphragm; and/or wherein
the stem head is separated from the self-tapping stem thread by a discharge groove which, when the control stem is inserted with the self-tapping stem thread into the wall which delimits the diaphragm seat, deforming the material of the diaphragm, the deformed material enters the discharge groove preventing unscrewing of the control stem from a coupling position of the control stem to the diaphragm.

15. The fluid shut-off device of claim 1, wherein said control element is connected to a control shaft of an actuator.

16. The fluid shut-off device of claim 1, wherein said control element is constantly biased to the closing position of the inlet duct by a spring.

17. The fluid shut-off device of claim 1, wherein the fluid shut-off device further comprises at least one of the following features or a combination thereof:
said control element is an element in a single piece;
said control element is received in said diaphragm seat;
said control element comprises a control element plate, and the control element plate is in a single piece with the control stem;
said control element comprises a control element plate, and the control element plate comprises a diaphragm support surface facing the diaphragm bending portion;
said control element comprises a control element plate, and the control element plate comprises a diaphragm support surface and the diaphragm support surface is conical or in the shape of a spherical sector;
said control element comprises a control element plate, and the control element plate comprises a diaphragm support surface, wherein
in a position of the diaphragm for closing the inlet duct and in a condition in which the diaphragm is not worn or aged, a diaphragm clearance exists between the diaphragm support surface and the diaphragm bending portion, and wherein the diaphragm clearance increases by moving from the diaphragm sealing portion to a diaphragm connecting portion for connecting the diaphragm to the valve body.

18. The fluid shut-off device of claim 1, wherein said inlet duct and said outlet duct intersect one another at approximately a 90° angle.

19. The fluid shut-off device of claim 1, wherein at least one of said inlet duct and said outlet duct has a gravitational lower surface at a same height as said sealing surface.

20. The fluid shut-off device of claim 1, wherein said fluid shut-off device is a Clean & Aseptic Design (CAD) device.

21. A fluid shut-off device comprising:
a valve body;
said valve body at least partially delimiting an inlet duct and an outlet duct, said inlet duct having a predetermined transverse inlet duct dimension;
said valve body comprising an intermediate portion, said intermediate portion at least partially delimiting an intermediate chamber, said intermediate chamber providing a fluid connection between the inlet duct and the outlet duct;
wherein
said inlet duct comprises an inlet duct connection edge formed by an intersection between the intermediate portion and the inlet duct;
said intermediate chamber comprises a sealing surface;
said intermediate chamber accommodates a diaphragm;
said diaphragm has a body in a single piece;
said diaphragm comprises a diaphragm sealing portion, and said diaphragm sealing portion, in a closing position of the inlet duct, cooperates, by a diaphragm support surface, with the sealing surface to occlude the inlet duct;
said diaphragm comprises a diaphragm bending portion, and said diaphragm bending portion permanently connects the diaphragm sealing portion to the valve body so as to operate exclusively under bending;
said diaphragm sealing portion delimits a diaphragm seat;
said fluid shut-off device further comprises a control element;
said control element comprises a control stem having a predetermined transverse control stem dimension;
said control stem is integrally received in the diaphragm seat;
said control stem transmits a movement to the diaphragm sealing portion at least between the closing position of the inlet duct and an opening position of the inlet duct, moving along a predetermined diaphragm movement direction;
wherein
said sealing surface is a flat sealing surface placed orthogonally to the predetermined diaphragm movement direction;
said diaphragm support surface is a flat support surface placed orthogonally to the predetermined diaphragm movement direction;
said predetermined transverse control stem dimension is between a value greater than the predetermined transverse inlet duct dimension and a dimension that leaves a distance, measured on a plane orthogonal to the predetermined diaphragm movement direction, between the control stem and the inlet duct connection edge, lower than 25% of the predetermined transverse inlet duct dimension; and
wherein said control stem comprises a self-tapping stem thread that screws on by entering into the body of the diaphragm creating a diaphragm thread in the diaphragm seat, thus creating a close coupling between a profile of the self-tapping stem thread and the body of the diaphragm, said self-tapping stem thread is a thread of a cortical type that deforms the body of the diaphragm by screwing into a wall of the diaphragm seat, so as to penetrate into the body of the diaphragm with a resistant section of the body of the diaphragm that is subjected to thrust during closing and to pulling during opening of the diaphragm, and at least one of said inlet duct and said outlet duct has a gravitational lower surface at a same height as said sealing surface.

\* \* \* \* \*